United States Patent [19]

Becker et al.

[11] Patent Number: 5,462,438

[45] Date of Patent: Oct. 31, 1995

[54] METHOD OF DISPLAYING MULTIPLE TIME SERIES AND DISPLAY GENERATED THEREBY

[75] Inventors: Richard A. Becker, Warren; Linda A. Clark, Mountainside; Diane Lambert, Berkeley Heights, all of N.J.

[73] Assignee: AT&T IPM Corp., Coral Gables, Fla.

[21] Appl. No.: 165,427

[22] Filed: Dec. 10, 1993

[51] Int. Cl.⁶ ..................................................... G09B 29/00
[52] U.S. Cl. ........................... 434/430; 283/115; 395/140
[58] Field of Search ..................................... 434/430, 188, 434/428; 395/140; 283/44, 115

[56] References Cited

U.S. PATENT DOCUMENTS

| | | | |
|---|---|---|---|
| 1,402,803 | 1/1922 | Smith | 283/115 |
| 4,730,262 | 3/1988 | Watanabe et al. | 395/140 |
| 4,954,981 | 9/1990 | Dehner, Jr. et al. | 395/140 |
| 5,016,170 | 5/1991 | Pollalis et al. | 395/140 X |
| 5,230,040 | 7/1993 | Yamashita | 395/140 X |
| 5,313,571 | 5/1994 | Hirose et al. | 395/140 |

OTHER PUBLICATIONS

J. M. Chambers et al., *Graphical Methods for Data Analysis*, 1–4, 315–331, The Wadsworth Statistics/Probability Series, Bell Telephone Laboratories, Incorporated, Murray Hill, N.J. (1983).

R. A. Becker et al., "The New S Language," Preface Bell Telephone Laboratories, Incorporated, Murray Hill, N.J. (1988).

W. S. Cleveland, *Visualizing Data*, Published by Hobart Press, Summit, N.J. (1993).

W. S. Cleveland, *The Elements of Graphing Data*, 230–232, Bell Telephone Laboratories, Inc., Murray Hill, N.J. (1985).

*Primary Examiner*—Gene Mancene
*Assistant Examiner*—Jeffrey A. Smith
*Attorney, Agent, or Firm*—Katharyn E. Olson

[57] ABSTRACT

Cave plots are a graphical techniques for comparing two time series using overlapping and opposing coordinate systems. The plots are space-efficient, allowing comparisons involving many data points and can be used with irregularly-spaced time series.

14 Claims, 3 Drawing Sheets

METHOD OF DISPLAYING MULTIPLE TIME SERIES AND DISPLAY GENERATED THEREBY

TECHNICAL FIELD

This invention relates to a method of displaying data from multiple time series.

BACKGROUND OF THE INVENTION

Graphical displays serve a number of important functions. For example, graphical displays may record and store data compactly. Graphical displays are also strong and convenient tools for data analysis. Unlike numerical data analytic procedures (e.g. data reduction techniques), graphical display methods show data in a way that allows users to recognize general behavior, to study details and to find the unexpected. Additionally, graphical displays are relevant for effective data communication in presenting qualitative information to others.

The importance of graphical display techniques in data analysis and communication is well recognized. In particular, aspects of graphical perception (the ability of the human eye-brain system to decode quantitative information from graphical displays, to summarize information and to focus on salient features) have been explored. See, e.g., John M. Chambers et al., *Graphical Methods for Data Analysis*, Duxbury Press, Boston (1983); William S. Cleveland, *The Elements of Graphing Data*, Wadsworth Advanced Book Program, Monterey (1985); Edward R. Tufte, *The Visual Display of Quantitative Information*, Graphics Press, Cheshire, CT (1983); William S. Cleveland, *Visualizing Data*, Hobart Press, Summit, NJ (1993). Similarly, technological advances in the computer peripheral and printer industries as well as advances in computer languages have made graphical displays easier to generate. See, e.g., Richard A. Becker et al., *The New S Language*, Wadsworth & Brooks/Cole, Pacific Grove, CA (1988).

Although the above references discuss some general graphical techniques and aspects of graphical perception, effective graphical display techniques are not yet available for many data situations. In particular, effective methods for comparing large amounts of data from multiple time series (i.e., data obtained as a function of time) in a space-efficient manner have proven difficult. Thus, there is a need for an effective method of graphically displaying time series data that permits individual values to be seen, highlights short-term fluctuations and is capable of showing large amounts of data in a relatively small amount of space.

SUMMARY OF THE INVENTION

In accordance with the present invention a graphical technique for presenting time series data using overlapping and opposing coordinate systems is disclosed. The resulting graphs, termed "cave plots," are easy to produce, readily understood and are capable of compactly displaying large collections of data.

In the preferred embodiment, the graphical technique is used to display sets of data using a first coordinate system having a left vertical axis and a first horizontal axis originating at the left vertical axis and extending to the right to a first endpoint. A second coordinate system is then constructed comprising a right vertical axis and a second horizontal axis. The second horizontal axis originates at a second endpoint and extends to the right to the right vertical axis. The second coordinate system should be positioned so that the right vertical axis is parallel to and to the right of the left vertical axis and above the first horizontal axis. The area covered by the first and second coordinate systems may coincide to form an overlap area. The left vertical axis is then scaled from bottom to top, and the right vertical axis is scaled from top to bottom. The first and second horizontal axes are scaled such that values for the horizontal axes increase in the same direction. All scaling should accommodate the domain and range of values in the data sets. A first set of data is then displayed on the first coordinate system, and a second set of data is displayed on the second coordinate system.

BRIEF DESCRIPTION OF THE DRAWINGS

Other features and advantages of the invention will become apparent from the following detailed description taken together with the drawings in which.

DETAILED DESCRIPTION

Figure 1:
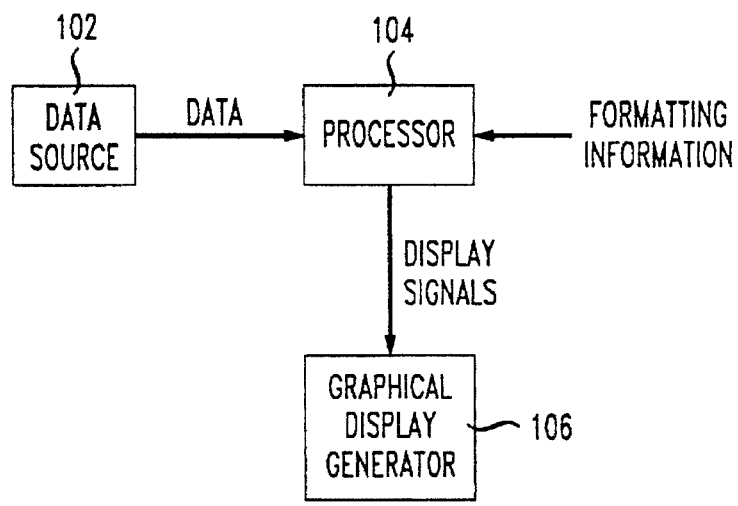
FIG. 1 is a block diagram of a system for generating a graphical display.

FIG. 1 is a block diagram of a typical system for generating a graphical display in which the present invention may be practiced. Data source 102 provides data to processor 104 for display. Those skilled in the art will recognize that data source 102 will encompass a wide variety of devices and processes capable of data storage and/or generation. For example, data source 102 may be a memory device in which the data is simply stored in the device, or more generally, data source 102 may be a process which generates data and sends data to processor 104 in real time. Processor 104 receives the data from data source 102 and formats it according to formatting instructions. Graphical displays may be generated in a variety of formats (e.g., point graphs, histograms, etc.). Those skilled in the art will recognize that the formatting instructions may be provided by a variety of means, e.g., by interaction with a user of the system in FIG. 1 or by applications programs which scan the data and select a specific format based on the range and type of data values. Processor 104 then sends display signals to graphical display generator 106. The display signals comprise control signals, data signals and other signals necessary for producing a display of the data on graphical display generator 106 according to the format instructions. Graphical displays may be produced on a variety of media (e.g., on paper, on a computer screen, etc.), and thus graphical display generator 106 may be a pen plotter, laser printer, cathode ray tube or any other device capable of presenting graphical information.

Figure 2:
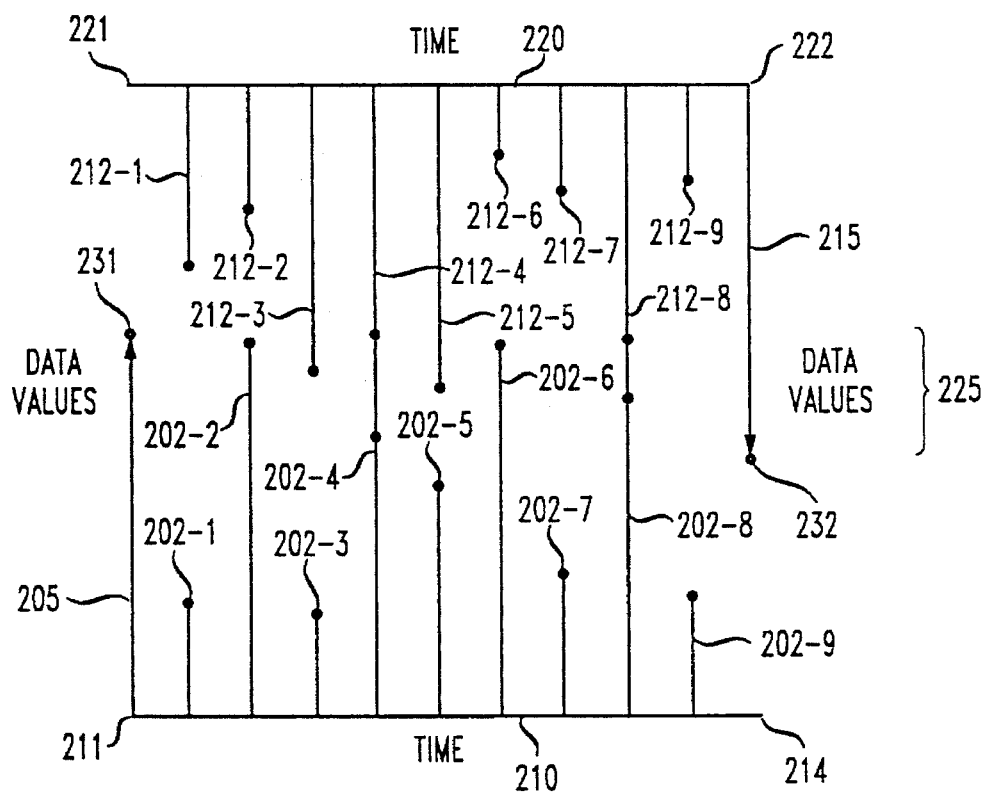
FIG. 2 is a diagram illustrating the elements of a cave plot.

FIG. 2 illustrates the elements of a graph generated according to the inventive method. The graph, which displays data values from two time series, is termed a "cave plot" in that values of one series are plotted as stalagmites, from the bottom up, and the other series is plotted top to bottom as stalactites. Data from first time series $202\text{-}i$, $i=1, 2, 3, \ldots 9$, is plotted utilizing a first coordinate system comprising left vertical axis 205 and first horizontal axis 210. Left vertical axis 205 and first horizontal axis 210 are advantageously scaled with values to accommodate the range and domain of values in first time series 202-i. The values on left vertical axis 205 increase from bottom to top. First horizontal axis 210 extends from left vertical axis 205 (typically from the bottom at point 211) out to the right to first endpoint 214. Second time series 212-j, j=1, 2, ... 9, is plotted utilizing a second coordinate system comprising right vertical axis 215 and second horizontal axis 220. Right vertical axis 215 is parallel to and to the right of left vertical axis 205 and above first horizontal axis 210. The values on right vertical axis 215 increase from top to bottom. Second horizontal axis 220 is parallel to and above first horizontal axis 210 and extends from second endpoint 221 to the right to right vertical axis 215 (typically to the top of right vertical axis at point 222). Right vertical axis 215 and second horizontal axis 220 are advantageously scaled to accommodate the range and domain of values in second time series 212-j. Both first horizontal axis 210 and second horizontal axis 220 are scaled such that the values for each axis increase in the same direction, e.g. from left to right.

Typically, the scaling of the vertical axes is such that the range of values of right vertical axis 215 and left vertical axis 205 are identical. In FIG. 2 the data in first time series 202-i and second time series 212-j represent values from two time series sampled at the same instances of time. In this case, there is an identical domain of time values in the two time series, so it is advantageous to scale first horizontal axis 210 and second horizontal axis 220 identically. That is so that both axes cover the same domain of time values and have the time units of each horizontal axis per physical unit of space on the plot be the same (e.g. one month of time corresponds to one inch on each horizontal axis). Like values on the two horizontal axes are aligned (e.g. align time t=5 on first horizontal axis 210 with time t=5 on second horizontal axis 220).

Alternatively, first horizontal axis 210 and second horizontal axis 220 may be scaled differently. For example, if one series lags behind another, it is possible to adjust for the lag by offsetting the scaling on one of the horizontal axes to bring the series into alignment. In other cases, the number of observations in each data series may be different and/or the times at which observations in each series were taken may differ. Nevertheless, the series may still be displayed using cave plots where the axes in each coordinate system are properly scaled to accommodate the domain and range of values in each series.

Overlap area 225 in FIG. 2 is the portion of the cave plot between left vertical axis 205 and right vertical axis 215 and between first maximum value 231 on left vertical axis 205 and second maximum value 232 on right vertical axis 215, i.e., that portion of the cave plot where the axis areas defined by the first and second coordinate systems coincide or overlap. Either time series may have data points in this area and considerations in determining the size of overlap area 225 are discussed below. Typically, left vertical axis 205 and right vertical axis 215 cover the same range of data values, but the vertical axes are scaled so that extreme values from either series do not completely cover the vertical range of overlap area 225.

Figure 3:
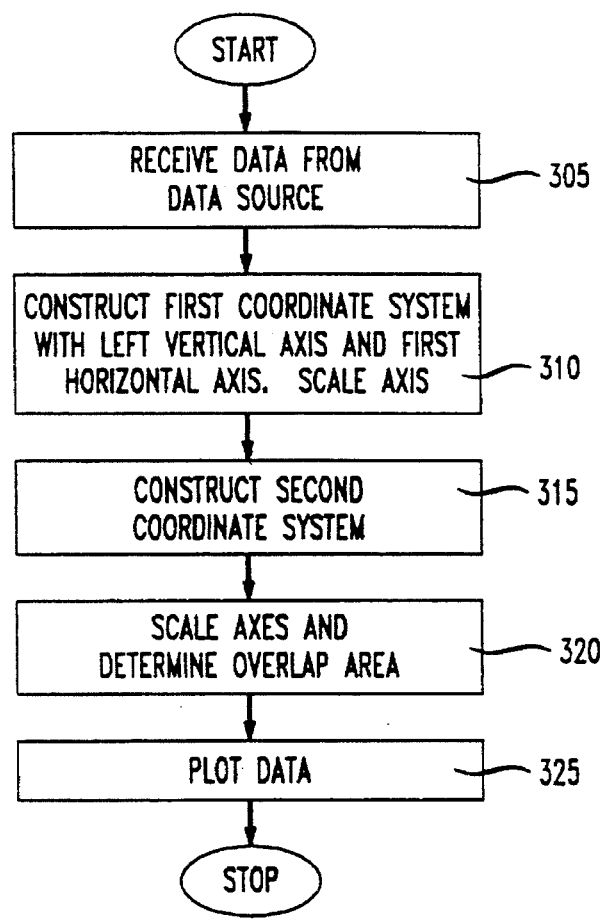
FIG. 3 is a flow chart of the steps in generating cave plot graphical displays.

FIG. 3 illustrates the steps in graphically displaying time series data using cave plots. In step 305 data is received from data source 102. Left vertical axis 205 and first horizontal axis 210 are constructed in step 310 to form a first coordinate system which is scaled in step 320 according to the domain and range of values for the data. In step 320 the extent of overlap area 225 is also determined, e.g. by a user of the display system or automatically by processor 104. In step 315 right vertical axis 215 and second horizontal axis 220 are constructed to form a second coordinate system which is scaled in step 320. Finally in step 325, the data is plotted using vertical lines that extend from the appropriate axis to the data value. Thus, the resulting cave plot advantageously displays two time series on the same plot with opposing and overlapping coordinate systems. Space on the graph is conserved by scaling the vertical axes maxima so that the two series may overlap but only infrequently. Those skilled in the art will recognize that these steps need not necessarily be performed in the order described above. For example, the overlap value determination in step 315 may be performed after step 305. See, Becker, supra. S advantageously provides an environment for initial data manipulation, storage of the processed data, and analytical computations as well as graphical displays.

Figure 4:
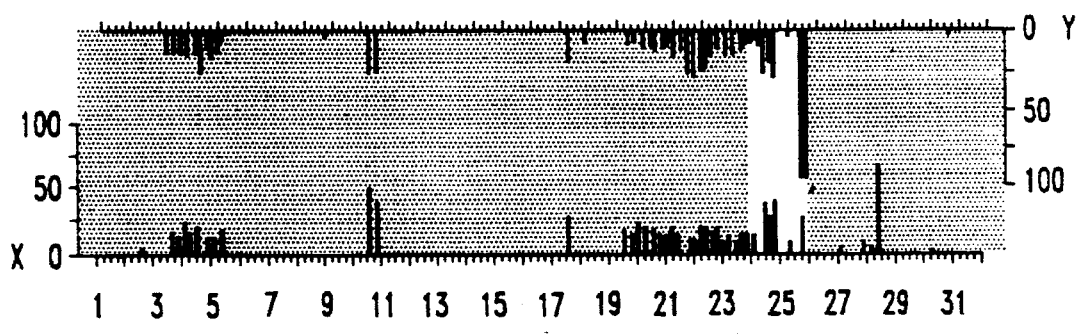
FIG. 4 illustrates a typical cave plot showing network reliability data.

FIG. 4 illustrates two time series graphically displayed as cave plots and demonstrates why cave plots are an effective way of displaying time series data. First, cave plots advantageously allow individual values to be seen, highlight short-term fluctuations, and are capable of showing large amounts of data. Second, the plots allow the two series to share a commonly scaled horizontal axis. Third, cave plots make the overlap plotting area do double duty. This follows Tufte's, supra, heuristic of a high data density in that the cave plot can potentially display thousands of data values in a small space.

The cave plot of FIG. 4 shows network reliability data. Monitoring equipment checked several networks at approximately 15-minute intervals, measuring the fraction of calls blocked in that interval—an important parameter in evaluating network performance. Measurements were made from local switches to approximately 50 nodes in the studied networks. Since conventional plots would take page after page of output to display, for example, a year's worth of data, cave plots satisfy the need for making efficient use of space while simultaneously giving a clear view of the data. The horizontal axis in FIG. 4 shows time (days). The left scale corresponds to data from network X, whose data values are encoded by the lines emanating from the bottom of the plot. The right scale is for network Y and increases from top to bottom. The data shown are blocking rates measured approximately every 15 minutes for one month— approximately 2800 measurements (mostly zero). Notice FIG. 4 has several areas of interest, i.e. areas of the display which may reflect characteristics that may be important in effectively presenting the graphical display or in presenting information contained therein. For example, several areas of FIG. 4, such as days 3 through 5, illustrate symmetric blocking. An area of interest can be enhanced by contrasting the background area of the area of interest with the background area of the rest of the display. In FIG. 4 the region of sustained high blocking during days 24 and 25 is emphasized by not stippling or shading the background area for those days.

Figure 5:
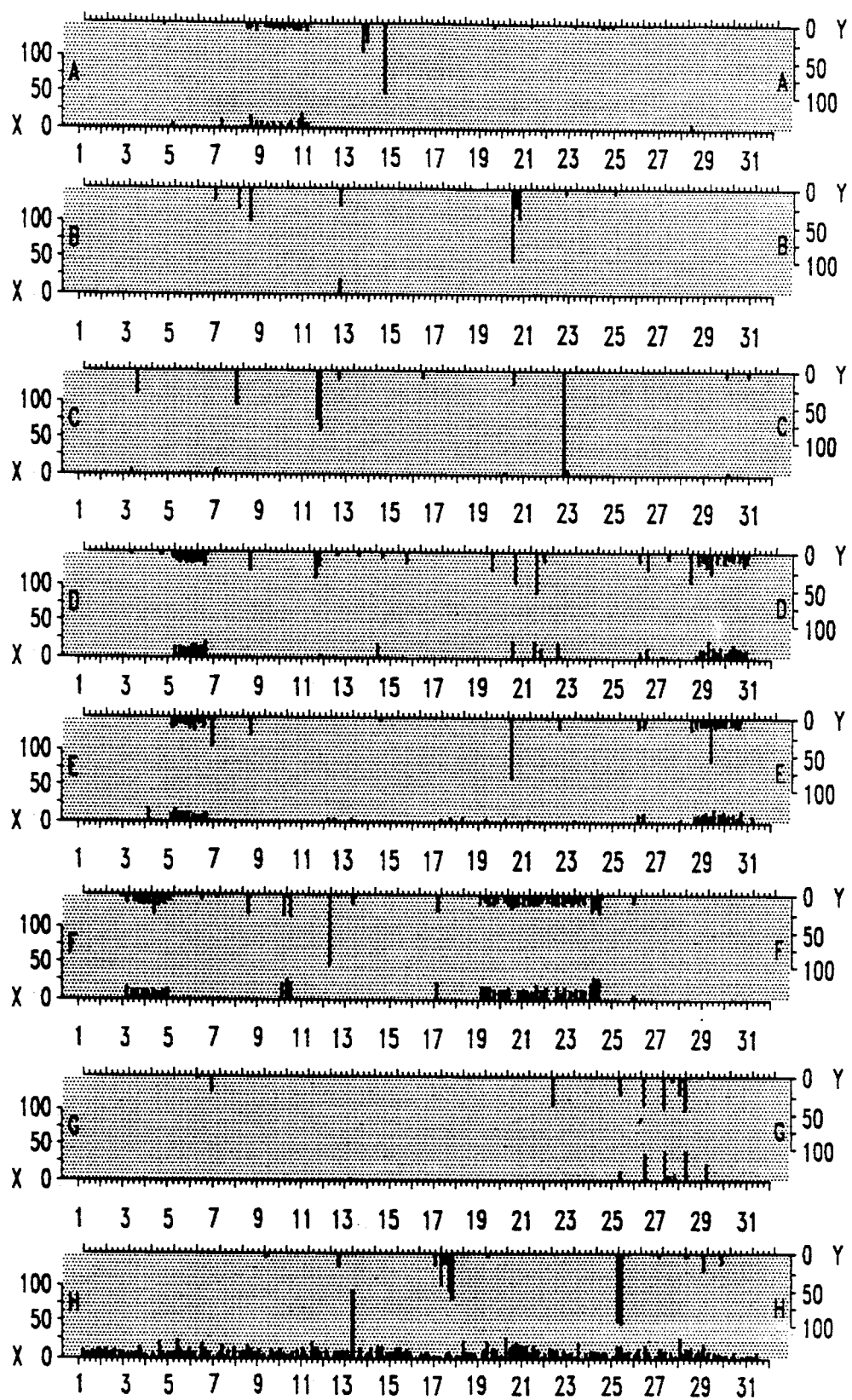
FIG. 5 illustrates a series of cave plots showing reliability data for a number of nodes in a network.

The value of a graphical display is determined not by theoretical concerns, but by its effectiveness in actual use. FIG. 5 illustrates the insights that can be gleaned from a cave plot. FIG. 5 is a series of cave plots comparing networks X and Y for one month, based on the percent of calls originating from each of eight nodes (A–H) that experienced blocking. One characteristic of the plots is that they are not overly dense. Most of the time, blocking is zero on both networks. When there is blocking, it often occurs simultaneously on both networks with approximately the same magnitude, as shown by the symmetric stalactite/stalagmite patterns (for example, Node F from day 19 to day 24). This could be due to problems that affect access to both networks equally. At other times, the patterns show similar behavior in several nodes for both networks. Notice, for example, Nodes D and E for days 5–6 and 29–31 for networks X and Y show similar behavior. Occasionally, the cave plot will show an asymmetric pattern, with a sequence of large values associated with only one network. This can be seen several times for network Y in FIG. 5. For example, notice node A on day 14, node B on day 20, node C on day 11, and node H on day 25. Network Y clearly has more periods with 50% or greater blocking. Network X seems to have a persistent low-level problem at node H through the entire month.

Occasionally, the cave plot may leave the viewer with a mystery. Consider node C on day 22. There is obviously a period of high blocking on both networks, but the only conclusion that the viewer can draw is that the sum of the blocking on the two networks was at least 150%; it is not possible to decide in this case if one network had more blocking than the other or if the problem equally affected both networks. The occurrence of overlap illustrates a key tradeoff between data density and resolution. Had the axes been scaled so that the 100% scaling marks did not overlap, then the ambiguity would be avoided, but all of the lines on all of the plots would be shortened, making it harder to see the more subtle situations or else the plots would be fatter and therefore less space-efficient. The larger the amount of overlap area, the more space saved on the graph and the more collisions between the two sets of data. However, it may be possible to infer what happened in a cave plot collision by observing the trends and patterns before and after the collision.

The Y-axis scaling on a cave plot should be chosen carefully. The maximum on the Y-axis should typically be at least a little larger than the maximum data value to be plotted; if not, it will be impossible to tell whether a maximum data value originated at the top or bottom since the vertical line representing the maximum data value will connect the two horizontal axes. For network data, where 100% blocking is achieved during periods of maximum stress—this means that the entire vertical scale should correspond to at least 105%. FIGS. 4 and 5 show vertical scales that accommodate a 150% maximum scaling value thus illustrating a good compromise—not wasting too much space and seldom having conflicts between bottom and top time series. It also gives natural reference lines at 50% blocking which is considered an important level of blocking by those skilled in the art of network architecture and design.

Typically for a cave plot to be effective, the highest values of the two time series should seldom be achieved in concert. There are important data situations for which this is the case, notably ones that are measuring infrequent "events" of some sort, where the data values typically are low (zero) and values increase during an event. The data may be a time series giving failure rates, seismic activity or unusual weather events.

Cave plots, using vertical lines, show the times at which data was collected. Cave plots can also show periods when the two time series were impacted equally. This is true even though the data may not be collected at precisely the same times. The cave plot allows the user's eyes to detect associations between events in both networks in situations where detecting those same associations numerically could be difficult (because the time series were not measured at precisely the same times). Thus cave plots work advantageously with irregularly-spaced time series. Because there is no line connecting adjacent observations, there is no implicit smoothing as would be the case with connected line graphs—just the raw data values are plotted. The vertical lines give added emphasis (more ink) to the large values, which is appropriate when large values correspond to important events.

Attention to details in the implementation of cave plots can prove important. For example, care should be used to treat the two time series symmetrically. The adjacent cave plots FIG. 5 share a common time axis that labels the bottom axis of the top plot and the top axis of the bottom plot. All labels in FIGS. 4 and 5 are horizontal and easy to read. Network names are attached to the axes; node names are symmetrically displayed at both ends of each plot.

Likewise, the graphical presentation can be enchanced when the inside of the data region or a portion of it is shaded or stippled with a light background. An ordinary plot has a rectangular frame around it, delimiting and connecting the area of the plot and lending a sense of sameness to the entire area. A cave plot does not have a complete rectangular frame, but the shading on the cave plot serves the same purpose and makes it much easier to view a large collection of juxtaposed cave plots as in FIG. 5. In FIG. 5 an explicit decision was made that the vertical axis lines would only connect to the horizontal axis from which the data values grow. While this emphasizes the connections between the left/bottom axes and the top/right axes, it also leads to a disconnectedness of the box that outlines the plot and necessitates the interior shading. Without shading, it is difficult to visually parse a collection of cave plots to determine which axes make up the pairs. Area shading (coloring) is a particularly effective graphical technique that is relatively recent to statistical graphics; graphical devices are no longer restricted to the pen-plotter model of operation and most graphical displays are produced on a computer screen or a laser printer, each of which can produce areas of color or gray.

Finally, in order to evaluate data density and to estimate graph spacing, it is possible to determine how much information can be plotted using a cave plot. One measure is related to the size of a pixel. On a 300 dot-per-inch laser printer, an 8 inch wide plot occupies 2400 pixels and should be able to handle approximately that many data values. Since, in many situations appropriate to cave plots, the majority of time values are zero, substantially more than 2400 values can be displayed on one cave plot.

The above detailed description has illustrated a method for generating a graphical display of two time series. The method has not been limited to specific hardware or software. Instead, the method has been described in such a manner that those skilled in the art can readily adapt such hardware or software as may be available or preferable. Further, those skilled in the art will recognize that extensions of the method are possible. For example, since cave plots show only two time series, they are not immediately applicable to situations in which relationships between three or more series are to be investigated. However, interactive control may advantageously provide this capability; an interactive system can be designed that would allow rapid switching of which of many series are displayed on the top and bottom axes. Another area where dynamic graphics capabilities may advantageously be used would be, for example, to present a cave plot along with a slider to control the amount of axis overlap. If them are many large-magnitude events that occur simultaneously, the Y-axis size may need to be increased to prevent confusing overlaps of the top and bottom data. Likewise, color may be useful with cave plots. If the top and bottom series were plotted in different colors, with overlaps done in yet another color, it would be possible to understand better what is happening when overlap occurs. A colored background could also be useful to emphasize a particular area of the cave plots. This is illustrated in FIG. 4, where the non-shaded area is emphasized; with true color, several different regimes could be differentiated and emphasized.

We claim:

1. A method of displaying sets of data, said method comprising the steps of:

displaying a first coordinate system comprising a left vertical axis and a first horizontal axis, said first horizontal axis having a first endpoint and said first horizontal axis originating at said left vertical axis and extending to the right to said first endpoint, displaying a second coordinate system comprising a right vertical axis and a second horizontal axis, said second horizontal axis having a second endpoint and said second horizontal axis originating at said second endpoint extending to the right to said right vertical axis, said second coordinate system being positioned relative to said first coordinate system such that said right vertical axis is parallel to and to the right of said left vertical axis and above said first horizontal axis, scaling said first and second coordinate systems with values to accommodate values in said sets of data, wherein said left vertical axis is scaled from bottom to top, said right vertical axis is scaled from top to bottom, and said first and second horizontal axes are scaled such that values increase in the same direction, displaying the data in a first one of said sets on said first coordinate system, and displaying the data in a second one of said sets on said second coordinate system.

2. The method of claim 1 wherein said sets of data are time series.

3. The method of claim 1 further comprising the step of shading a portion of the area bounded by said right and left vertical axes and by said first and second horizontal axes, said portion being defined as a function of an area of interest.

4. The method of claim 1 wherein said step of displaying a first set of data and said step of displaying a second set of data use vertical line graphs.

5. The method of claim 1 wherein said first set of data is displayed in a first color and said second set of data is displayed in a second color.

6. The method of claim 1 wherein said second coordinate system is further positioned relative to said first coordinate system so as to form an overlap area.

7. A display generated according to the method in claim 1.

8. A method of displaying sets of data, said method comprising the steps of:

displaying a first set of data on a first coordinate system, wherein said first coordinate system comprises a left vertical axis and a first horizontal axis originating at said left vertical axis and extending to the right to a first endpoint, wherein said first coordinate system is scaled with values to accommodate values in said first set of data and wherein said left vertical axis is scaled from bottom to top, and displaying a second set of data on a second coordinate system, wherein said second coordinate system comprises a right vertical axis and a second horizontal axis, said second horizontal axis having a second endpoint, said second horizontal axis originating at said second endpoint extending to the right to said right axis, wherein said second coordinate system is scaled with values to accommodate values in said second set of data, wherein said right vertical axis is scaled from top to bottom and wherein said second horizontal axis is scaled such that values increase in the same direction as values for said first horizontal axis, said second coordinate system being positioned relative to said first coordinate system such that said right vertical axis is parallel to and to the right of said left vertical axis and above said first horizontal axis.

9. The method of claim 8 wherein said sets of data are time series.

10. The method of claim 8 further comprising the step of shading a portion of the area bounded by said right and left vertical axes and by said first and second horizontal axes, said portion being defined as a function of an area of interest.

11. The method of claim 8 wherein said step of displaying a first set of data and said step of displaying a second set of data use vertical line graphs.

12. The method of claim 8 wherein said first set of data is displayed in a first color and said second set of data is displayed in a second color.

13. The method of claim 8 wherein said second coordinate system is further positioned relative to said first coordinate system so as to form an overlap area.

14. A display generated according to the method in claim 8.

* * * * *